United States Patent [19]

McDaniel et al.

[11] 4,226,301
[45] Oct. 7, 1980

[54] COLLAPSIBLE SAWHORSE

[76] Inventors: Horace J. McDaniel, 215 Bryan Blvd., Plantation, Fla. 33318; James A. Young, 720 NW. 178th Terrace, Miami, Fla. 33169

[21] Appl. No.: 7,350

[22] Filed: Jan. 29, 1979

[51] Int. Cl.³ .......................................... F16M 11/00
[52] U.S. Cl. ................................... 182/155; 182/225
[58] Field of Search ............... 182/155, 153, 181–186, 182/224, 225, 226

[56] References Cited

U.S. PATENT DOCUMENTS

| | | | |
|---|---|---|---|
| 1,143,397 | 6/1915 | Horn | 182/153 |
| 1,435,738 | 11/1922 | Reiman | 182/155 |
| 1,611,376 | 12/1926 | Reiman | 182/155 |
| 3,045,777 | 7/1962 | Dintelmann | 182/153 |

Primary Examiner—Reinaldo P. Machado
Attorney, Agent, or Firm—Barry L. Haley; Eugene F. Malin; Philip R. Wadsworth

[57] ABSTRACT

A foldable, collapsible sawhorse that includes a rigid beam horizontally supported near its end by pairs of legs moveably connected to a rigid plate that is hinged to the beam. Each plate includes first and second areas that are angularly disposed relative to each other, with the first area having mounted thereupon a beam-receiving channel. The second area of the plate includes a circular aperture and an arcuate slot which are vertically aligned that receive fasteners for each support leg connected thereto. The legs are thus pivotal relative to the plate which allow them to be spread apart or placed in parallel by loosening of a single fastener for each leg. The beam channel includes apertures for fasteners which allow the beam to be hingeably moved relative to the beam-receiving channel on the plate. Thus, the sawhorse may be collapsed by moving the pairs of end legs to a central parallel position in the plane of the beam and then moving each set of legs substantially parallel to the beam. The angle between the first and second plate areas allows the legs to be parallel and in close proximity to the central beam in the collapsed position.

2 Claims, 7 Drawing Figures

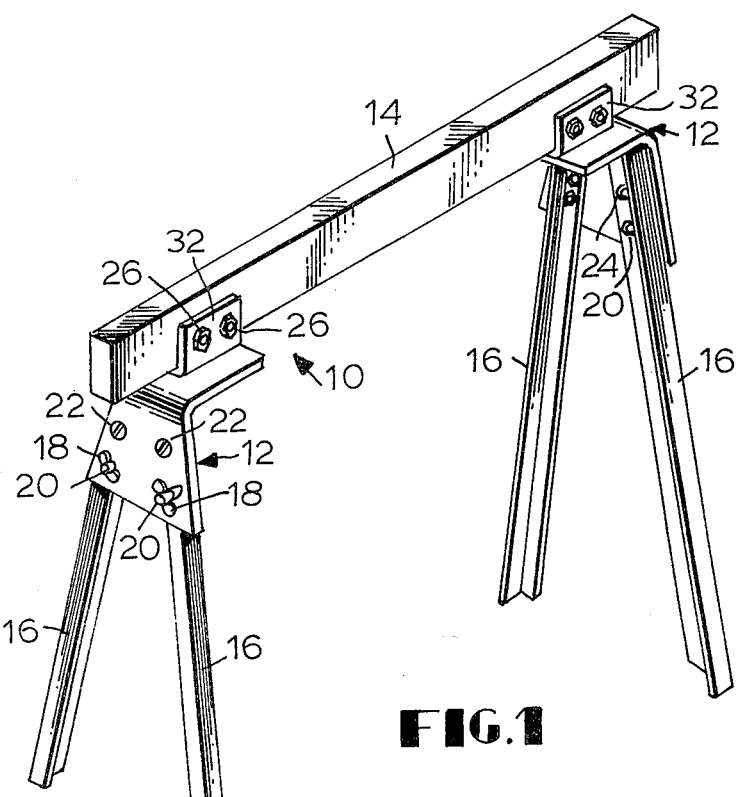
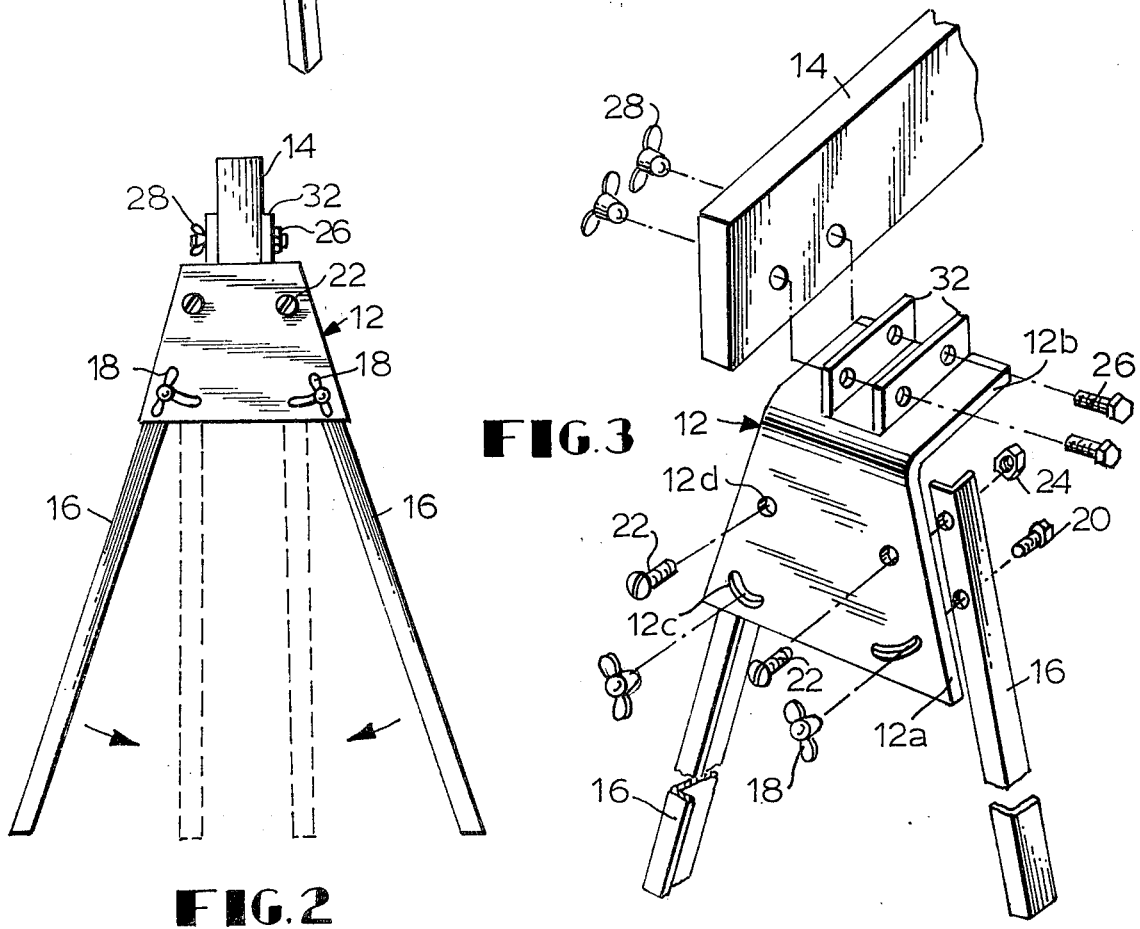

COLLAPSIBLE SAWHORSE

BACKGROUND OF THE INVENTION

The present invention relates to a sawhorse that is extremely stable and yet integrally foldable and collapsible to a minimal volume, for storage on a wall, shelf or any desired location.

Prior art sawhorses either are too cumbersome to transport, if sturdy, or are unsturdy, and time consuming if partially collapsible. The present invention is sturdy, foldable, collapsible to minimal volume, and relatively non-complex in operation.

BRIEF DESCRIPTION OF THE INVENTION

A foldable, collapsible sawhorse comprising a rigid, elongated beam, a pair of hingeable plates, one connected at each end of said beam, and a pair of vertically disposed legs moveably connected to each of said plates.

Each plate has first and second areas that are angularly disposed relative to each other (approximately 130 degrees). The first area has mounted on its upper surface a pair of rigid, parallel vertical walls that engage the side walls of the beam, which in conjunction with a bolt fastener forms a hinge between the plate and the beam.

The second area on the plate is used to connect a pair of vertical, rigid support legs to the plate. For each leg, the plate includes a first circular, upper aperture that receives a fastener and disposed below the upper aperture and in line with an arcuate slot that also receives the fastener that connects the leg to the plate. The circular upper aperture in conjunction with the fastener forms a pivot point between the leg and the plate while the arcuate slot allows the fastener to be moved relative to the plate for movement of the leg from the spread working position to a central position in the plane of the beam. This allows the pairs of end legs to be moved parallel to each other for the storage position.

In operation, the sawhorse is set up with the pairs of end legs spread apart and the fasteners disposed through the arcuate slots are tightened. In one embodiment, wing nuts may be used so that they can be tightened or loosened by hand. The additional fasteners which fasten the beam to the plate are tightened. To collapse the device, one of the fasteners that connects the beam to the plate is removed, leaving single fasteners at each end that act as a hinge to allow the entire plate to be moved relative to the beam.

The fasteners in the arcuate slots are loosened and the legs are moved inwardly in a parallel position substantially in the plane of the beam. Each end plate is then pivoted inwardly toward the beam, aligning all four legs in parallel in the plane of the beam for the collapsed, storage position. Each plate area angle is such that the legs are parallel and almost up against the central beam.

It is an object of this invention to provide an improved, foldable, collapsible sawhorse that is stable in the work position and readily foldable and collapsible for the stored position.

And yet still another object of this invention is to provide a lightweight, sturdy, collapsible sawhorse that may be readily folded up for storage or made portable.

In accordance with these and other objects which will be apparent hereinafter, the instant invention will now be described with particular reference to the accompanying drawings.

BRIEF DESCRIPTION OF THE DRAWINGS

FIG. 1 shows a perspective view of the instant invention in the working position.

FIG. 2 shows a side elevational view of the instant invention.

FIG. 3 shows a perspective, fragmentary exploded view of the end plate utilized with the instant invention.

PREFERRED EMBODIMENT OF THE INVENTION

Figure 4:
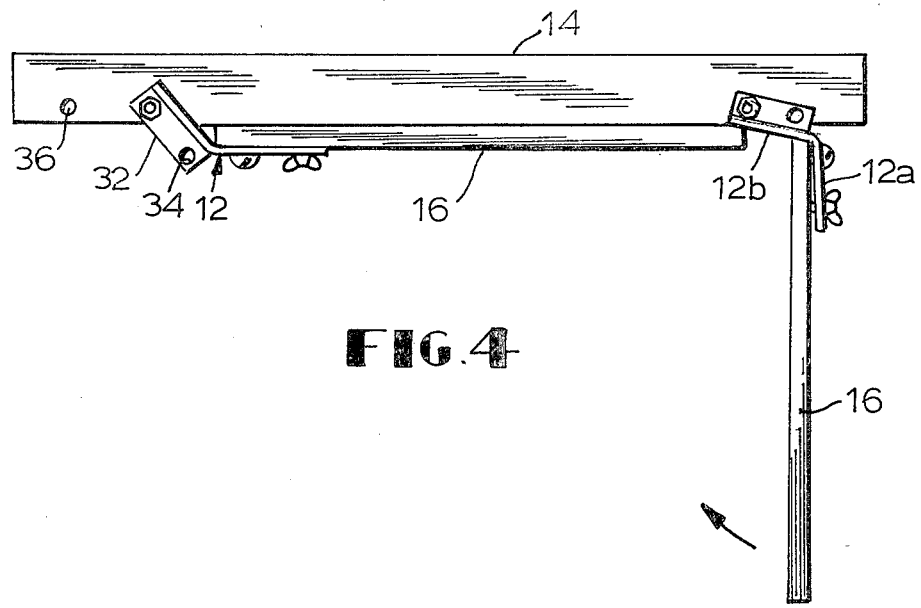
FIG. 4 shows a front elevational view with one pair of legs in a collapsed position.

Referring now to the drawings and specifically FIG. 1, the instant invention is shown generally at 10 comprising a rigid, elongated beam 14 that is connected near each end to plates 12. Each of the end plates 12 are identical in construction. A pair of rigid, vertical supporting legs 16 are connected by fasteners 20 and 22 to one area of each plate 12.

On the upper portion of the plate 12 are a pair of rigid, vertically disposed walls 32 which receive the sides of the beam 14. Referring now to FIGS. 2 and 3, it can be seen that the beam 14 is attached by fasteners 26 through apertures in the side walls 32 and the beam by adjustable wing nuts 28. With both fasteners in place and tightened, the beam 14 is rigidly fixed to the plate 12.

Legs 16 are attached to the plate by upper fasteners 22 which are received through apertures 12d in the plate and by lower fasteners 20 which are received through arcuate slot 12c. To collapse the legs 16 inwardly in a parallel position as shown dotted in FIG. 2, the wing nuts 18 are loosened when the plate and the legs move inwardly to the parallel position, at which time the wing nuts may be tightened again. The arcuate slot 12c allows for movement of the legs without removing the fastener 20 completely.

Figure 5:
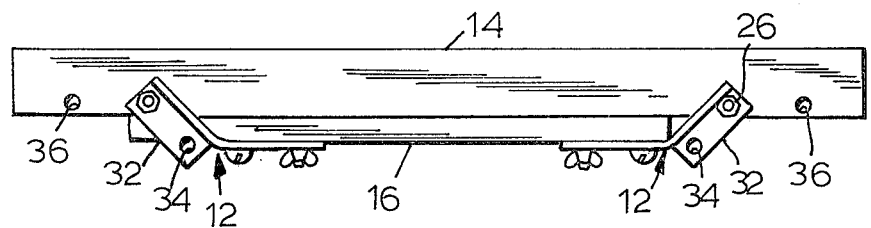
FIG. 5 shows the instant invention in a completely collapsed position.
Figure 6:
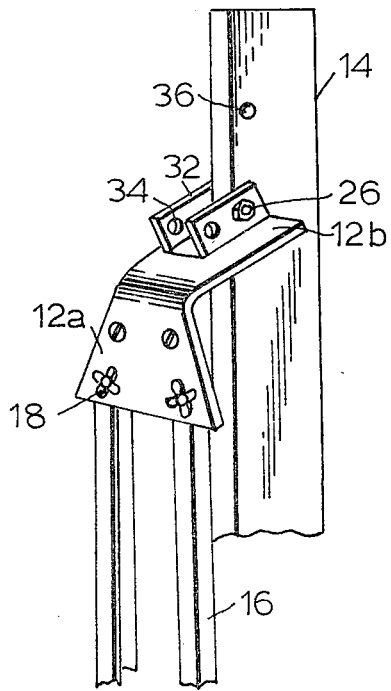
FIG. 6 shows a perspective view showing the hinge action between the plate and the beam.

Once the legs are moved to a parallel position for storage, one of the fasteners connecting the beam 14 with the plate 12 is removed so that the remaining fastener acts as a hinge so that the entire plate and pair of legs attached thereto can be moved to a position as shown in FIG. 4. Once positioned, as in FIG. 4, the removed fastener can be inserted back through aperture 36 for storage to prevent loss of the fastener. FIG. 5 shows the entire sawhorse in the folded, collapsed position with both pairs of legs 16 essentially parallel to the beam 14. A space is provided between the vertical walls 32 to permit hinge movement as shown in FIG. 6 between the plate 12 and the beams 14. The upper area of the plate 12b is angularly disposed relative to the lower plate area 12a, which may be diverging towards its base. In one embodiment, the angle between the upper portion 12b and the lower portion 12a of the plate may be substantially approximately a 135 degree angle. However, the angular separation could be anywhere from 90 degrees to approximately 150 degrees depending upon the length of plate area 12a. The plate angle and length (area 12a) are such to insure that leg 16 (see FIG. 4) is both parallel and as close to beam 14 as possible.

Figure 7:
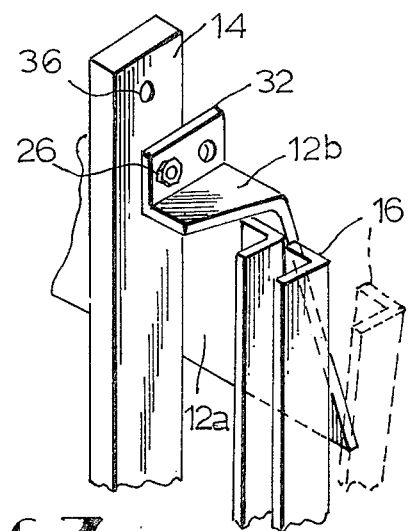
FIG. 7 shows a fragmentary perspective view of one side of one end plate of the instant invention.

FIG. 7 shows the plate area 12a engaging and overlapping outside leg 16 (connected at opposite end) which further acts to restrain outward movement of the free end of the leg (in the collapsed position as shown) due to frictional engagement of the leg 16 and the plate area 12a.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A collapsible sawhorse, comprising:

a rigid beam, said beam having a first and second lateral passage near one end, and a third and fourth lateral passage near the opposite end;

a pair of rigid plates, each plate having a first area and a second area, said first and second areas defining planes, said planes being at a predetermined angle relative to each other, said first area having a slot disposed adjacent one end, said slot being sized to receive the lateral width of said rigid beam, said slot being further defined by a pair of substantially perpendicular flanges upwardly disposed and parallel, spaced to encompass the lateral sides of said rigid beam, said flanges including first and second apertures for receiving fasteners and said apertures being spaced apart equal to the first and second and third and fourth lateral passages in said rigid beam, the first area including a portion beyond said slot, said portion for receiving said rigid beam, said beam being extended in length to overlap the non-slotted portion of the first area, the second area including first and second apertures for receiving a fastener and corresponding arcuate apertures; and first and second pairs of rigid legs, first and second fasteners connected between said legs and second area of said rigid plate, third and fourth fasteners connected in said arcuate slots whereby said legs may be pivoted from a first spread apart position to a second substantially parallel position by loosening said fasteners in said arcuate slots; and fifth and sixth removable fasteners disposed between said flanges of said first area, one of said fasteners acting as a pivot such that removal of one fastener in said flange will allow said plate to be rotated such that said legs are parallel to said beam.

2. A sawhorse as in claim 1, wherein:

said fasteners in said arcuate slots include wing nuts, and said fastener through one of said flange apertures includes a wing nut.

* * * * *